United States Patent [19]

Fischer et al.

[11] Patent Number: 5,975,059
[45] Date of Patent: Nov. 2, 1999

[54] METHOD AND DEVICE FOR THE CLOSED-LOOP CONTROL OF A CONTROL ELEMENT HAVING INTEGRAL ACTION

[75] Inventors: Werner Fischer, Heimsheim; Kai-Lars Barbehoen, Ludwigsburg, both of Germany

[73] Assignee: Robert Bosch GmbH, Stuttgart, Germany

[21] Appl. No.: 09/072,232

[22] Filed: May 4, 1998

[30] Foreign Application Priority Data

May 28, 1997 [DE] Germany ............ 197 22 288

[51] Int. Cl.[6] .................................................. F02M 37/04
[52] U.S. Cl. ...................................................... 123/502
[58] Field of Search ................................ 123/357, 359, 123/500, 501, 502, 198 D, 479

[56] References Cited

U.S. PATENT DOCUMENTS

| | | |
|---|---|---|
| 3,968,779 | 7/1976 | Davis ............................ 123/502 |
| 4,132,273 | 1/1979 | Mortonson et al. . |
| 4,580,220 | 4/1986 | Braun et al. . |
| 5,048,488 | 9/1991 | Bronkal ......................... 123/502 |
| 5,085,190 | 2/1992 | Birk et al. . |
| 5,806,498 | 9/1998 | Iwai et al. ...................... 123/502 |

FOREIGN PATENT DOCUMENTS 41 05 740  9/1991  Germany .

*Primary Examiner*—Thomas N. Moulis
*Attorney, Agent, or Firm*—Kenyon & Kenyon

[57] ABSTRACT

A method and a device for the closed-loop control of a control element having integral action, particularly an injection-timing device of a high-pressure fuel pump. Using a system deviation as a baseline, a controller preselects a driving signal to be applied to the control element. In the event of an error in the area of actual-value ascertanment, an emergency travel operation is initiated. A signal is applied to the control element, such that at least short-term, it assumes a defined position.

10 Claims, 3 Drawing Sheets

METHOD AND DEVICE FOR THE CLOSED-LOOP CONTROL OF A CONTROL ELEMENT HAVING INTEGRAL ACTION

FIELD OF THE INVENTION

The present invention relates to a method and a device for controlling a control element having integral action, particularly an injection-timing device of a high-pressure fuel pump, in closed loop.

A method and a device for controlling a control element in closed loop are known, for example, from German Patent No. 41 05 740 (corresponding to U.S. Pat. No. 5,085,190). It describes a method and a device for the closed-loop control of a control element which influences the start of injection of a high-pressure fuel pump.

A controller determines a driving signal to be applied to the control element, using a system deviation as a baseline. In order to be able to compensate for tolerances between individual control elements and ageing phenomena in routine operation, an adaptation of the driving signal of the control element is carried out.

Given a control element having integral action, in the event of a malfunction of the actual-value sensor, it is not possible to go over easily to an open-loop control, since a specific position of the control element cannot be allocated to a specific driving signal. At best, a specific change in the position of the control element can be allocated to a specific driving signal. Therefore, emergency travel operation is not straight away possible in the event of a malfunction of the actual-value sensor.

SUMMARY OF THE INVENTION

An object of the present invention, given a method and a device for the closed-loop control of a control element having integral action, is to provide an emergency travel operation in the event of a malfunction of the actual-value sensor.

The method of the present invention allows an emergency travel operation, even given a control element having integral action.

DETAILED DESCRIPTION

Figure 1:
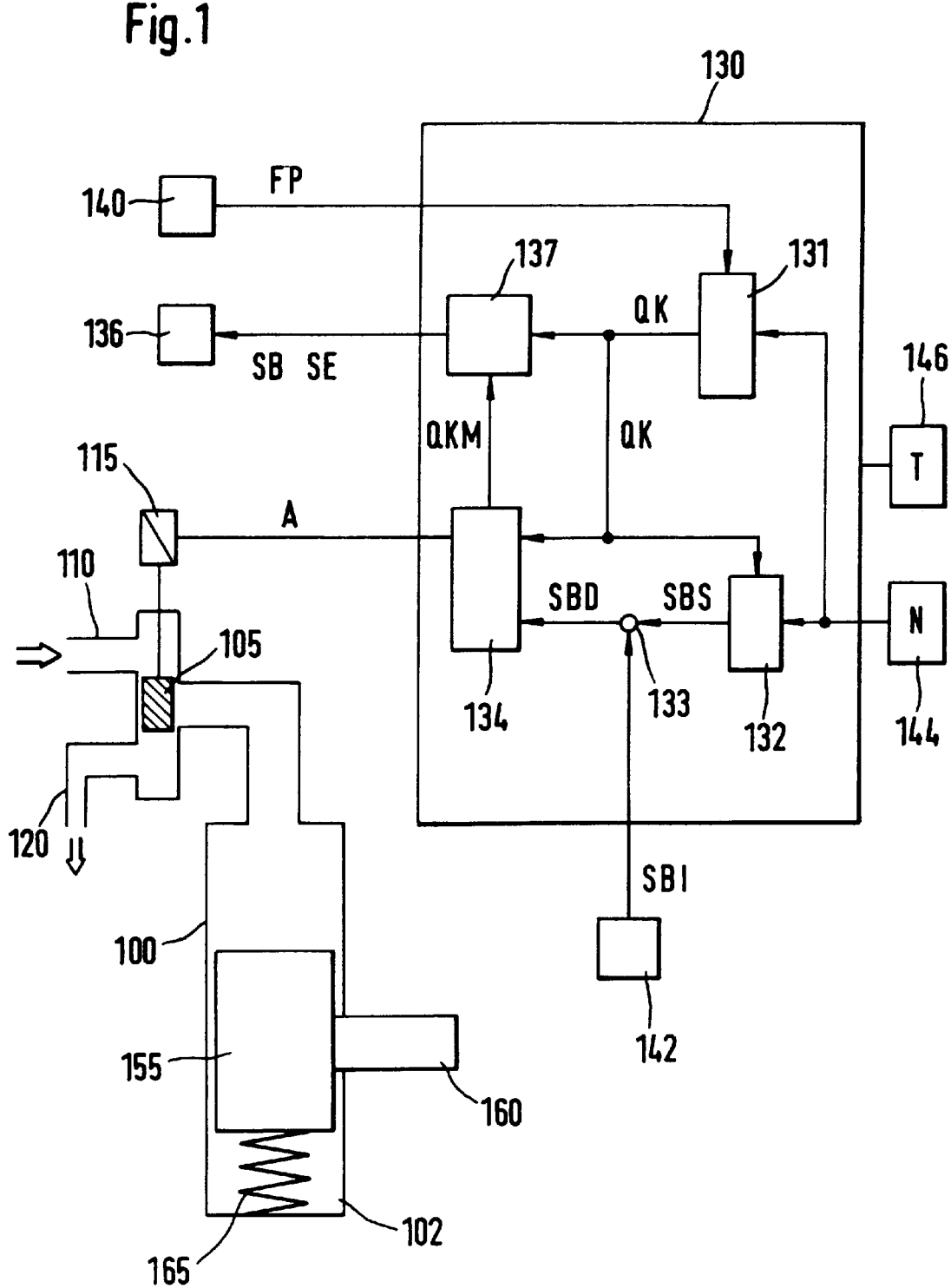
FIG. 1 shows a block diagram of the device of the present invention.

Shown schematically in FIG. 1 with the aid of a block diagram is the device of the present invention. An injection-timing device is designated by 100. Such timing devices are usually employed for setting the start of pump delivery and/or the delivery rate for distributor injection pumps.

The timing device includes an actuating arm 160 which engages with a "roller ring" of the distributor injection pump. By means of the timing device, the start of pump delivery can be adjusted with reference to the top dead center of the respective cylinder. The start of the pressure build-up in the element chamber of the distributor pump is designated as the start of pump delivery. The start of pump delivery is fixed by the start of the pump-piston movement, as well as by the closing of a solenoid valve. The movement of the pump piston is triggered by a cam which drives it.

The movement of the cam relative to the top dead center can be shifted by the injection-timing device. The start of pump delivery relative to the movement of the cam can be adjusted by means of the solenoid valve. Given a fixed position of the timing device, the start of pump delivery relative to the top dead center also changes in response to a change in the driving of the solenoid valve.

In addition to the start of pump delivery, the solenoid valve can also influence the delivery rate. If the solenoid valve is closed during the compressional movement of the pump piston, then the injection begins. Since the form of the cam influences the compressional movement, the delivery rate, i.e. the fuel quantity injected per degree of crankshaft, can be influenced by the fact that the solenoid valve is closed at different positions of the pump piston on the cam. The position of the start of injection relative to the movement of the cam, and thus to the pump piston, can be adjusted by means of the solenoid valve.

The actuating arm is coupled to a timing-device piston 155. Timing-device piston 155 is supported in a guide cylinder 150 and closes off a spring cavity 162 there with its one end face, and with its other side closes off a working chamber 107. Arranged in spring cavity 162 is a restoring spring 165 braced between timing-device piston 155 and guide cylinder 150.

A slide valve 105 can be adjusted by means of a coil 115. Depending on the position of slide valve 105, hydraulic fluid comes from an inlet line 110 and arrives in the working chamber, or from working chamber 107 into a return line 120.

The start of pump delivery can be adjusted by shifting timing-device piston 155 and actuating arm 160. If the intention is to advance the start of pump delivery, provision can be made, for example, for the piston of the timing device to be shifted downwards for this purpose. This is achieved by driving coil 115 in such a way that it releases the connection between the inlet line and working chamber 107. This causes pressure to act upon piston 155 of the timing device, the spring to be compressed, and the piston to move downwards.

If the intention is to retard the start of pump delivery as a function of the operating conditions, coil 115 is driven so as to release the connection between return line 120 and working chamber 107. As a result, timing-device piston 155 is relieved and moves upwards because of the spring tension, thus retarding the start of pump delivery.

Coil 115 receives driving signals from a control device 130. In addition, further controlling means 136, such as a solenoid valve, receive driving signals SB, SE from control device 130. Control device 130 processes various output signals from various sensors. They are, for example, means 140 for specifying a driver's command signal FP, a sensor 142 for detecting an actual value SBI, which indicates the actual start of injection and/or the actual position of the timing device, a sensor 144 for detecting a speed signal N and/or a sensor 146 for detecting a temperature value T.

In addition to other elements, control device 130 includes a setpoint selection 131 for injected fuel quantity, to which are fed driver's command signal FP and speed N, in addition to other variables not shown. The fuel-quantity setpoint selection makes available a fuel-quantity signal QK. A solenoid-valve control 137 receives this signal QK. Solenoid-valve control 137 applies driving signals to further controlling means 136, such as the solenoid valve.

Provision is also made for a setpoint selection 132 for receiving fuel-quantity signal QK and speed N, in addition to other variables not shown. Setpoint selection 132 provides a setpoint value SBS for controlling the injection-timing device in closed loop.

Setpoint value SBS and an actual value SBI are gated in a node 133. The output of node 133 is applied to a timing-device control 134, which can receive fuel-quantity signals QK as well. Coil 115 receives driving signals from timing-device control 134. In addition, timing-device control 134 is connected to solenoid-valve control 137.

Using operating parameters, such as at least the fuel-quantity signal QK and speed signal N, setpoint selection 132 calculates setpoint value SBS. This setpoint value is compared in node 133 to actual value SBI, and the system deviation SBD is formed. Timing-device controller 134 drives coil 115 using this system deviation SBD as a baseline.

Injection-timing device 100 has integral action. This means that if coil 115 receives a specific signal, this does not lead to a defined position of actuating arm 160. The result of a defined driving signal for coil 115 is a defined inflow or a defined discharge of pressurized media into or out of working chamber 107. As a rule, this causes a continuous shifting of piston 155 and actuating arm 160, respectively. The result of a defined driving signal for coil 115 is a defined change in the position of the final controlling element, and thus of the start of injection, as well.

In order for piston 155 to be retained in its position, it is necessary for coil 115 to receive a specific driving signal. A driving signal which results in an inflow or discharge of pressurized media is to be selected only in the event of a system deviation.

Figure 2:
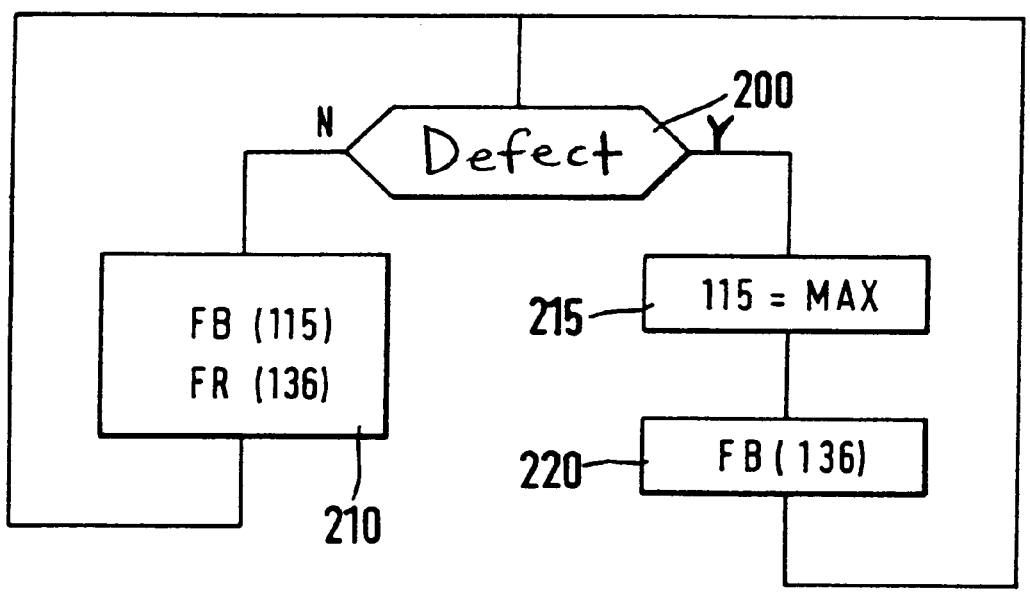
FIG. 2 shows a flow chart of a first embodiment of the method of the present invention.

FIG. 2 shows a first development of the method of the present invention. Since the injection-timing device shown is a control element having integrating action, it cannot be controlled in the event of a defect in the area of actual-value ascertainment, particularly given a malfunction of the actual-value sensor. It is not easily possible to apply a specific signal to the control element resulting in a specific position of the injection-timing device. Only the change in position of the control element, and not its position per se, can be stipulated by means of the defined driving signal.

Therefore, according to the present invention, in the event of a defect, the control element is brought to one of its limit stops. This means that timing-device piston 155, and thus the actuating arm, is shifted completely downwards or completely upwards. To this end, such a driving signal A is preselected that control element 105 completely releases the connection from supply line 110 to the working chamber, or that it completely releases the connection between the working chamber and return line 120. In the first case, the timing-device piston in FIG. 1 moves downwards. This means the start of pump delivery is adjusted to its advance limit stop. The equivalent holds true if the working chamber and the return line are open. In this case, the piston moves upwards, and the start of pump delivery is adjusted to its retard limit stop.

In systems like, for instance, a solenoid-valve-controlled distributor injection pump, in which the start of injection and the end of injection can be controlled by a solenoid valve, in case of a fault, a portion of the function of the timing device can be replaced by corresponding driving of solenoid valve 136.

This means that if, in the event of a fault, the timing device is located at the advance limit stop, the start of pump delivery by means of solenoid valve 136, which controls the injection, can be set by a corresponding later driving. To this end, timing-device control 134 applies a corresponding signal QKM to solenoid-valve control 137. Given such a procedure, it can occur that only a limited quantity of fuel is injected. This is especially the case when a retarded start of pump delivery is desired, since due to the retarded driving of the solenoid valve, only a small delivery angle remains to inject the desired injection quantity. This means only a relatively small quantity of fuel can be injected. For an emergency operation with restricted performance of the internal combustion engine, this is sufficient in wide operating ranges.

If, given large desired injection quantities, the intention is for a restricted travel operation to be possible as emergency travel operation in the extreme ranges as well, the procedure is as described in the following.

FIG. 2 illustrates the method of the present invention with a flow chart. A first query 200 checks whether a defect exists. If such a defect does not exist, the start of pump delivery is adjusted in step 210 by control element 115, and the delivery rate is adjusted by control element 136. If a defect is recognized in step 200, the recognition can by made, for example, by comparing for plausibility the output signals of the actual-value sensor to the setpoint value, or checking whether the actual value lies within a preset range of values. If query 200 recognizes that a defect exists, in step 215, a maximum value max is applied to control element 115, with the result that the control element moves to its limit stop. It is particularly advantageous if the closed-loop control and/or open-loop control of the start of pump delivery is taken over in step 220 by solenoid-valve control 137. The start of pump delivery FB is set in step 220 by means of control element 136.

The method of the present invention is such that, in the event of an error occurring in the area of actual-value ascertainment, control element 115 receives such a signal that it assumes a defined position. The defined position is preferably one of the two limit stops. This is preferably the maximumly advanced start of pump delivery, since in this case, it is possible to retard the start of pump delivery by a corresponding driving of the solenoid valve. A portion of the functions is taken over by another control element, particularly the solenoid valve, which controls the fuel quantity to be injected.

In an improved specific embodiment of the present invention, the control element is brought at least for a short time into a defined position, especially the retard limit stop. Using this position as a baseline, a simulated actual value is preselected for the following moments as a function of at least the driving signal which the final controlling element receives. The defined position is approached anew in preferred operating states. These preferred operating states are, in particular, deceleration, idling and shifting. Deceleration is recognized, for example, when the setpoint quantity, i.e. the fuel quantity to be injected, is less than a threshold value. As a rule, the idling state exists when the speed assumes the idling speed or an "idling-speed controller" is active.

Figure 3:
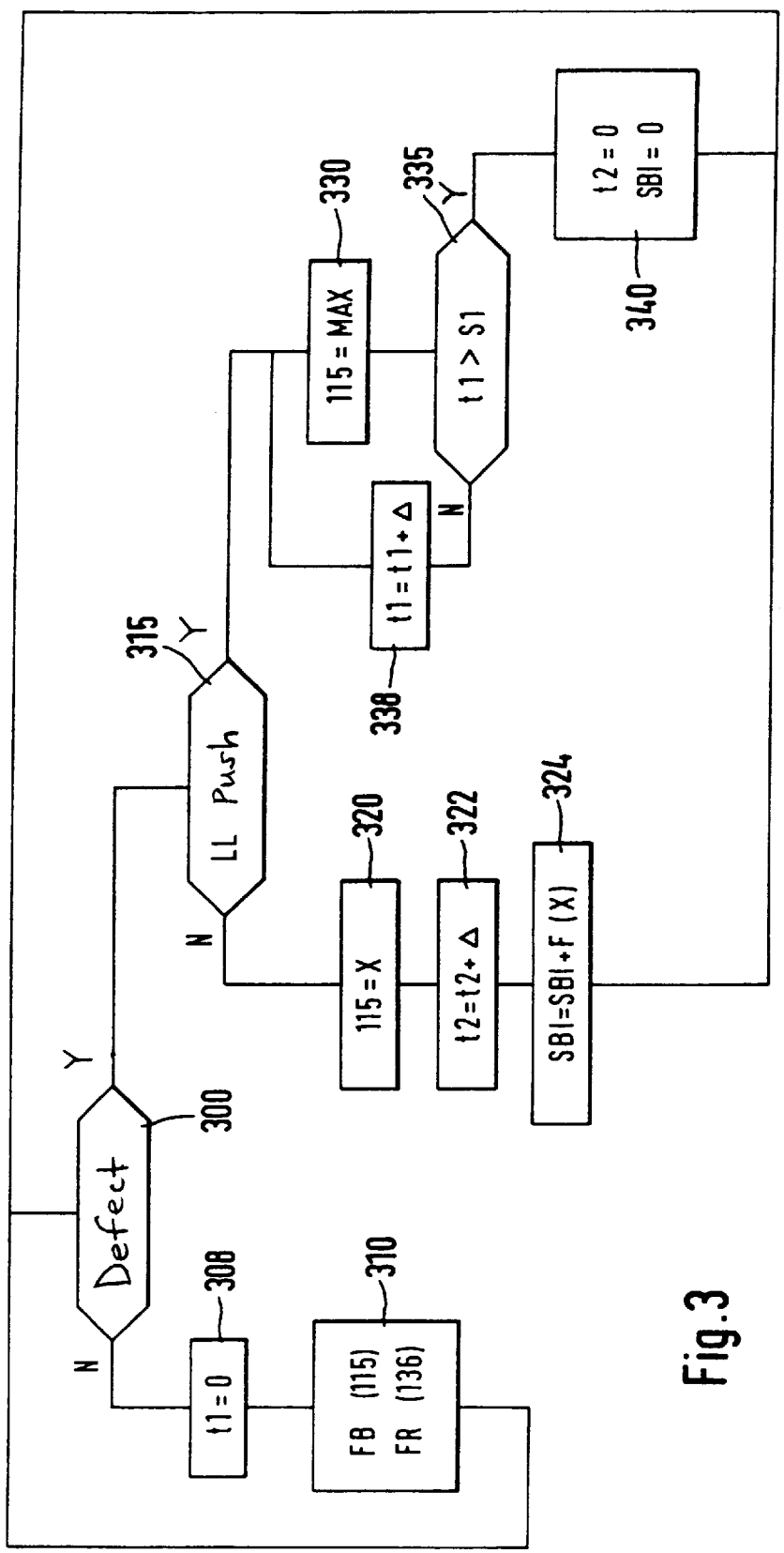
FIG. 3 shows a flow chart of a second embodiment of the method of the present invention.

A possible procedure for such an emergency travel operation is shown in FIG. 3. A first query 300 checks, corresponding to the manner of query 200 in FIG. 2, whether a defect exists. If this is not the case, a time counter t1 is set back in a step 305. Preferably, it is set to 0. In subsequent step 310, control element 115 for controlling the start of pump delivery and control element 136 for controlling the delivery rate are driven. Query 300 then follows once again.

If query 300 recognizes that a defect exists, then query 315 follows. Query 315 checks whether a preferred operating state exists. To that end, the operating conditions, as a function of the speed, the fuel quantity to be injected and possibly other variables, are stored in a family of characteristics. Query 315 checks, by means of the family of characteristics, whether a preferred operating state exists.

Moreover, a status is stored in a multidimensional family of characteristics as a function of various operating parameters such as, preferably, the fuel quantity to be injected and the speed. Thus, for example, status 1 is allocated to all preferred operating states, and status 0 is allocated to the remaining.

A preferred operating state is, for example, idling and/or deceleration.

If such a preferred operating state exists, the maximum value MAX is applied to injection-timing device 115 in step 330. This driving signal is so selected that the timing device assumes its retard limit stop. This means it moves upwards. The subsequent query 335 checks whether time counter t1 is greater than a first threshold value S1. If this is not the case, in step 338 the time counter is raised by the value Δ. Step 330 is subsequently carried out. Threshold value S1 corresponds to the time necessary to reliably bring the timing device into its retard position.

If time counter t1 exceeds threshold value S1, in step 340 a time counter t2 is set to 0 and the simulated actual value SBI is likewise set to 0. Query 300 is then carried out anew. If query 315 recognizes that the preferred operating state no longer exists, in step 320 a driving signal X is applied to timing device 115. In step 322, time counter t2 is subsequently raised by the value Δ. One specific embodiment can also provide for steps 320 to 324 to be executed when the preferred operating state still exists, but time threshold S1 is already exceeded. This means that the timing device has already reached its limit stops.

In step 324, the new value SBI for the simulated actual value is determined using the old stored, simulated actual value SBI and control signal X for the injection-timing device as a baseline. The dependence F of the actual value upon the driving time and the driving signal, respectively, is preferably stored in a family of characteristics. This value is applied to the timing device, until it has to have assumed its nominal position.

If query 300 recognizes that no defect exists, in step 305 time counter t1 is set to 0, and in step 310, the customary driving of control elements 115 and 136 is carried out.

According to the present invention, the injection-timing device is controlled, the position being determined, however, using not only the driving signal, but also the previous history, i.e. the preceding driving signals, as a baseline. The correlation between the path the timing device covers within a specific period of time, and the active operating parameters, particularly the driving signal, is stored in a family of characteristics. Thus, a simulation of the adjusting speed within a specified time frame is carried out. The injection-timing device is controlled in open loop, using as a baseline its mechanical retard position according to the data stored in family of characteristics 324. Due to interference effects, the timing device moves away from its calculated position, so that a new synchronization becomes necessary.

Stored in a second family of characteristics 315 are the operating conditions, in which a new synchronization is possible. For the new synchronization, the timing device is deliberately driven to its mechanical limit stop. This is preferably the retard limit stop.

It is particularly advantageous if the re-synchronization is carried out upon the occurrence of the preferred operating states, during which a short-term false position of the timing device is unimportant for the operational performance.

Furthermore, provision can also be made for a re-synchronization to be carried out when a preselected time span has elapsed since the last re-synchronization.

It is particularly advantageous if the two methods according to FIG. 2 and FIG. 3 are combined. This means, as long as an emergency travel operation according to FIG. 2 is possible, for instance given small load requirement and thus small injection quantities, a simple control of the timing device to one of its limit stops is carried out. If a simple emergency travel operation is not possible, for instance given great load requirement, and thus large injection quantities, a simulation of the actual value is carried out. In case of a fault, as a function of the injected fuel quantity or a signal corresponding to these variables, such as the driving duration of a solenoid valve, the control element is optionally simply driven to the limit stop, or the position is simulated using the known position of the control element at the limit stop and the driving signal as a baseline.

What is claimed is:

1. A method for a closed-loop control of a control element having an integral action, comprising the steps of:

preselecting, using a controller, a driving signal using a system deviation as a baseline;

applying the driving signal to the control element such that the control element at least temporarily assumes a defined position; and initiating an emergency travel operation if an error occurs in an area of an actual-value acquisition.

2. The method according to claim 1, wherein the control element includes an injection-timing device of a high-pressure fuel pump.

3. The method according to claim 1, wherein the defined position is a limit stop.

4. The method according to claim 1, further comprising the step of taking over, at least partially, a function of the control element by a further control element.

5. The method according to claim 4, wherein the further control element includes a solenoid valve.

6. The method according to claim 1, wherein the defined position is approached in preferred operating states.

7. The method according to claim 1, further comprising the step of specifying a simulated actual value using a known actual value in the defined position and the driving signal for the control element as the baseline.

8. The method according to claim 1, wherein preferred operating states include at least one of a deceleration and an idling state.

9. A device for a closed-loop control of a control element having an integral action, comprising:

a controller for preselecting a driving signal using a system deviation as a baseline;

means for applying the driving signal to the control element such that the control element at least temporarily assumes a defined position; and means for initiating an emergency travel operation if an error occurs in an area of an actual-value acquisition.

10. The device according to claim 9, wherein the control element includes an injection-timing device of a high-pressure fuel pump.

* * * * *